Figure 1:
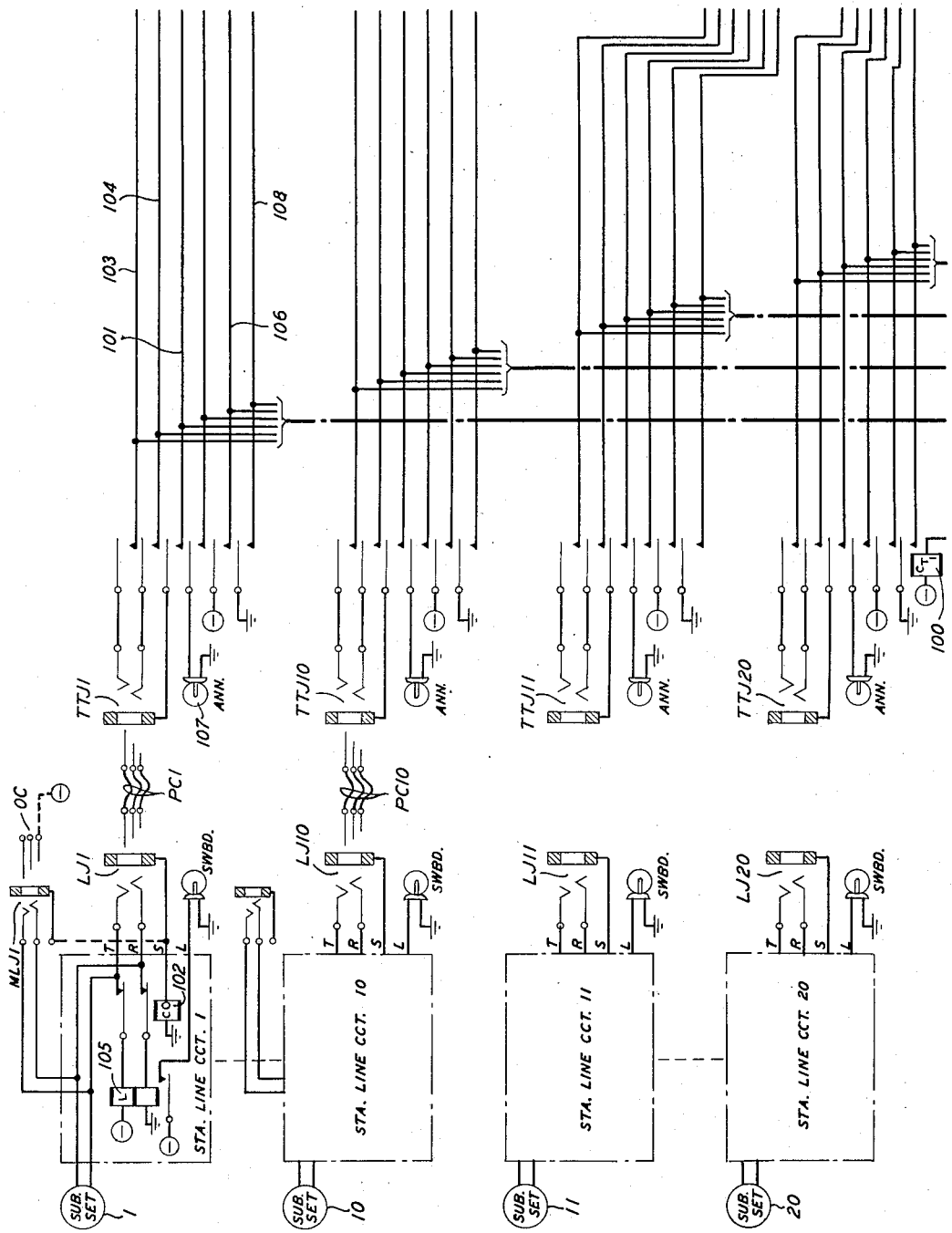

FIG. I

INVENTORS E. W. HENCHES
I. R. SHELDON
BY
ATTORNEY

INVENTORS
E. W. HENCHES
I. R. SHELDON
BY
ATTORNEY

INVENTORS E. W. HENCHES
I. R. SHELDON
BY
ATTORNEY.

Aug. 25, 1959 E. W. HENCHES ET AL 2,901,542
"WAKE UP" OR "MORNING CALL" SYSTEM FOR AUTOMATICALLY
SIGNALING PRIVATE BRANCH EXCHANGE EXTENSION STATIONS
Filed Oct. 12, 1956 11 Sheets-Sheet 8

INVENTORS E. W. HENCHES
I. R. SHELDON
BY
ATTORNEY.

INVENTORS E. W. HENCHES
I. R. SHELDON
BY
ATTORNEY

United States Patent Office 2,901,542
Patented Aug. 25, 1959

2,901,542

"WAKE UP" OR "MORNING CALL" SYSTEM FOR AUTOMATICALLY SIGNALING PRIVATE BRANCH EXCHANGE EXTENSION STATIONS

Eugene W. Henches, New York, and Ivan R. Sheldon, New Rochelle, N.Y., assignors to American Telephone and Telegraph Company, a corporation of New York Application October 12, 1956, Serial No. 615,520

12 Claims. (Cl. 179—6)

This invention relates to signaling systems and particularly to special service signaling systems of the type wherein telephone facilities are employed to alert subscribers on a selective basis at preset times, and are otherwise used in the performance of functions usually allocated to alarm clocks.

In various types of multitenant dwellings, whether institutional, recreational or otherwise in character, and particularly in hotels of various guest capacities, it is the desire of management to provide a service upon which the tenants or guests may rely to be alerted at any desired time of day or night, and particularly to be awakened at preselected times in the morning. The telephone facilities of such establishments afford convenient means for providing such services, which, heretofore, have been furnished, in each instance, by way of the telephone switchboard located at the particular establishment involved, and through the manual and vocal efforts of the attending operator and under her supervision. The provision of such services required that the operator, acting upon previously received instructions, establish connections to each of the involved extension stations at the times specified by the corresponding guests, tenants or subscribers, and to effect the ringing of the audible telephone signal at each station as a "morning call" signal. It is obvious that the operator at a manual switchboard must not only set up an individual connection to each of the involved extension lines by means of manually manipulated cord circuits, but must also manually ring on the line and orally transmit some message of greeting to the answering party. At an automatic exchange, the functions performed by the operator are no less time consuming. It is equally apparent that in large establishments, such as hotels and the like of large capacities, where great numbers of guests would avail themselves of such "morning call" service, the presently employed practice would be inadequate and impractical not only from the viewpoint of operator time involved, but also from the fact that conditions invariably would be encountered requiring the signaling of a large number of guests at the same time, conditions which, obviously, cannot be conveniently satisfied on a manual control basis.

It is the object of this invention to provide an improved system of "morning call" signaling of the type in which a subscriber's telephone instrument is employed as a "morning call" alarm, and in which an unlimited number of alarms may be selectively operated at preset times with a minimum of manual effort on the part of telephone personnel.

This object is attained, in accordance with a feature of the invention, by an organization of apparatus and circuitry which is correlated with available telephone switchboard equipment to provide "morning call" service automatically, to any number of extension stations normally served by the switchboard. More particularly, an involved multiple switchboard is provided with a patching panel comprising a predetermined number of time trunk-terminating patching jacks which may be individually connected, by cord-type connectors, to line extension multiple jacks located at an end position of the switchboard, and with a plurality of manually settable dial-type time switches, the settings of which determine the time at which each of the line extension jacks is automatically cut through to one of a plurality of announcement trunk circuits for the automatic transmission, to the corresponding extension station, of a "morning call" signal and of a morning salutation and/or time pronouncement.

Another feature of the invention contemplates a "morning call" signaling system in which the multiple line extension jacks serving those lines which are to receive "morning call" service may be connected to appropriate time trunk-identifying jacks during the hours from midnight to 6:00 a.m., usually when traffic at the involved switchboard is light, and in accordance with a previously prepared tabulated record which designates the hours at which the extension stations are to be automatically signaled.

A further feature of the invention provides for the simultaneous signaling of extension station groups successively, in accordance with a predetermined time pattern. Specifically, all stations which are to receive a morning call at the same time are grouped together and simultaneously signaled as a unit, and each group is signaled in succession in accordance with a pattern determined by the settings of the aforementioned dial-type time switches.

A still further feature of the invention provides for the allocation of a five-second period during which each extension station is tested to determine its idle or busy condition, and for the maintenance of the signaling condition for a longer predetermined time interval in order that a station, which tests busy and becomes idle before the expiration of the signaling period, will be signaled.

In accordance with another feature of the invention telephone calls in progress on extension lines at the time set for morning calls thereto proceed without interruption.

Still another feature allocates a predetermined time interval for transmitting all morning call signals. More particularly, the signaling cycle is automatically started and terminated under the control of time measuring means which functions to measure a time interval of approximately three hours.

Another feature of the invention provides duplicate regular automatic pronuouncement equipments to insure against failure of the system, and also emergency equipment for permitting the morning call pronouncements to be broadcast orally by an operator in the event the regular equipment should fail, or conditions be encountered which otherwise require such emergency operation.

These and other features of the invention will be readily understood from the following descriptions when read with reference to the accompanying drawings which comprise eleven sheets and twelve figures. When arranged in the manner indicated by Fig. 12, these drawings constitute an overall schematic diagram of the circuitry and apparatus involved in a morning call system which is adapted to serve a maximum of eight hundred guests, or extension stations. It is to be understood that the indicated capacity of the disclosed system has been chosen merely for exemplary purposes and that the disclosed circuitry and apparatus are equally well adapted to installations of greater or lesser capacities.

Before describing, in detail, the operation of the system disclosed in the drawings, a brief outline of the service provided thereby and of its basic functions will be given. This outline will be followed by preliminary descriptions of various components of the system shown in the several figures of the drawings, and of their functional cooperation.

Physically, the disclosed facilities contemplate the addition of a group of time trunk patching jacks and answer lamps to a private branch exchange switchboard at the establishment subscribing to the morning call service, and a multiplicity of patching cords which are used to connect the time trunk jacks to the line jacks of the extension lines of those guests who have requested to be alerted at particular times. The guest requests are received either by an attendant at the local private branch exchange or by a desk clerk, and all requests are sorted by time periods and tabulated on a master sheet during the hours between midnight and 6:00 a.m. when traffic on the switchboard is light. The patching cords are plugged up according to the information recorded on the tabulated master sheet. The service, in the illustrated embodiment, is designed to function for a three-hour period starting at 6:00 a.m. and terminating at 9:00 a.m., since the great majority of morning calls are desired during these hours. The timing circuit functions to insure the connection of a time- or announcement-trunk to a guest line at a preset time, and the trunk associates itself with a source of machine ringing current if it finds the guest line idle. When the guest answers, the corresponding answer lamp on the private branch exchange switchboard is lighted and locked operated and the guest line is connected to a recorded announcement which may take any desired form, as for example:

"Good morning, we hope you have enjoyed a restful night at the —— Hotel. You requested to be called and in a moment you will hear the exact time from the time bureau."

As soon as the guest restores the handset to its support after receipt of the recorded message, the extension line is made available for regular use. Should the guest fail to answer the morning call, ringing current is maintained on the line for a predetermined interval of time, such as two and one-half minutes, and the failure to answer is indicated by the failure of the corresponding answer lamp to light. In such an eventuality, the management would take appropriate action.

Figure 9:
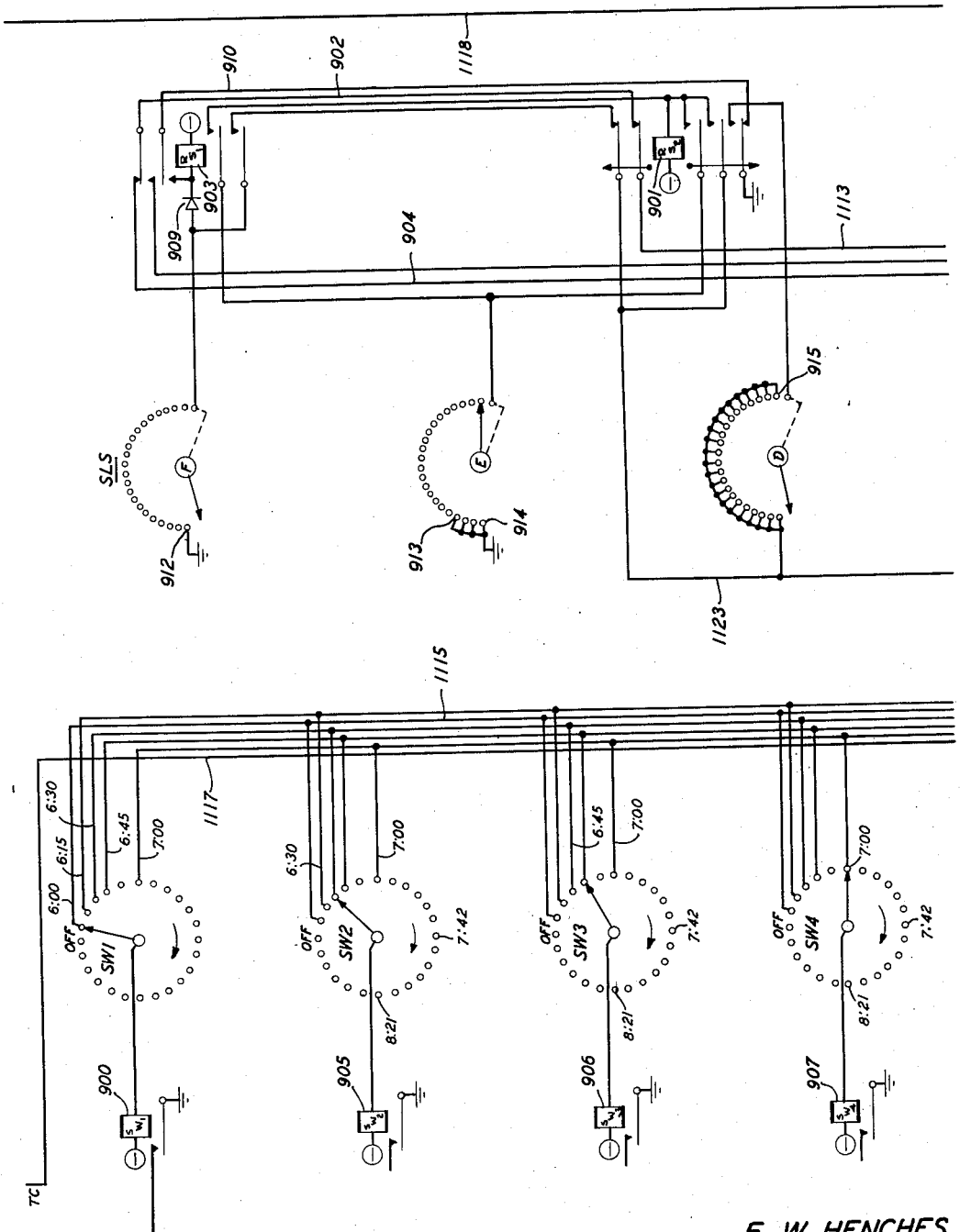
Figure 11:
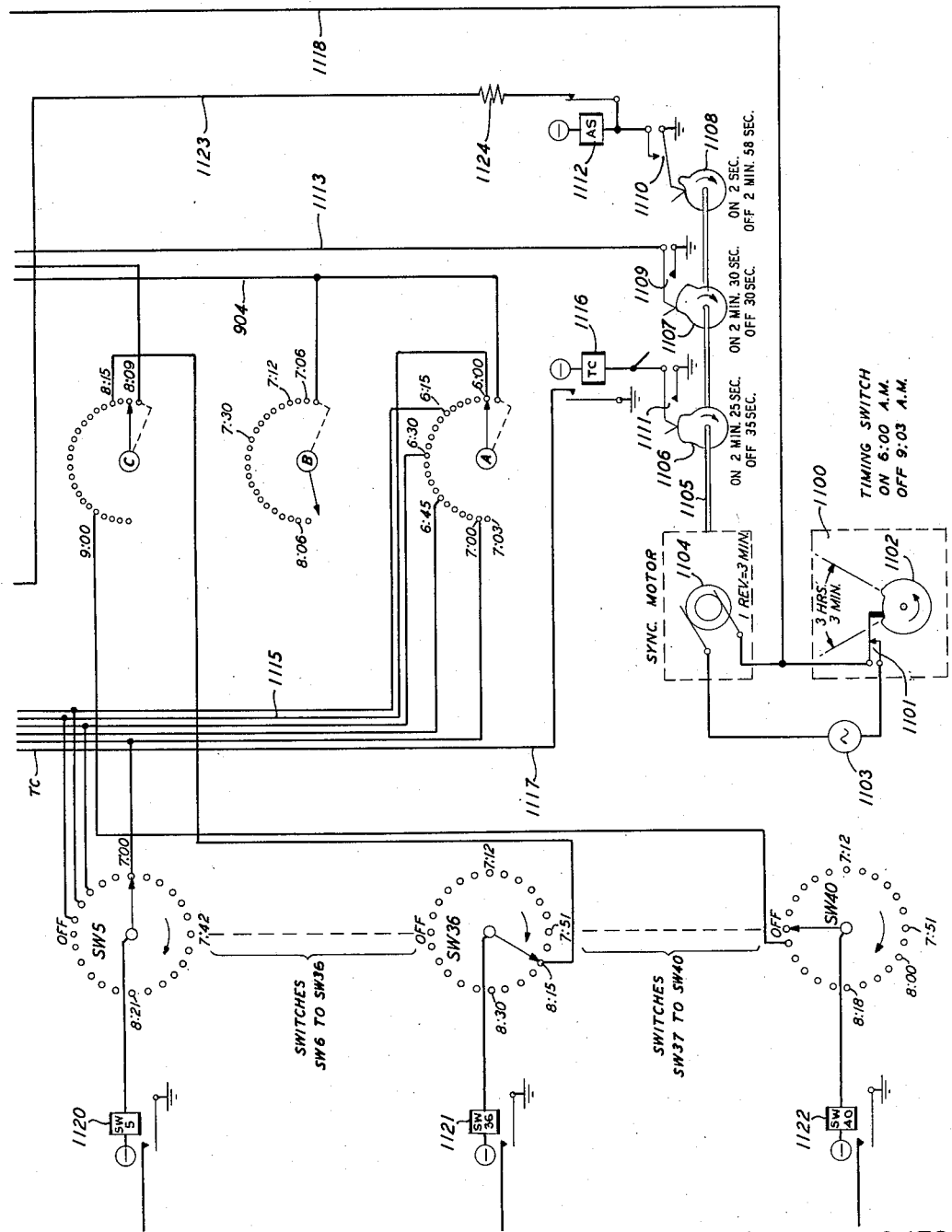

Reference is now made to the various figures of the drawings with a view to setting forth their content and functional cooperation. The timing switch 1100 (Fig. 11), which may be of any well known design, through its cam-operated contacts 1101, completes an energizing circuit for a synchronous motor 1104 at the time determined by the switch setting, which usually would be a 6:00 a.m. setting, and the motor functions to drive a shaft 1105 which carries three cams, one of which is cam 1108. This latter cam controls the operation of a rotary type stepping switch SLS (Figs. 9 and 11) in such a manner that the switch is continuously operated for a three-hour interval at the rate of one step every three minutes. The wipers of the terminal banks of switch SLS are so mutually arranged, with respect to the switch terminals and controls, that the banks A, B and C become successively enabled, so that the terminals of the three combined banks are effectively engaged and marked successively, beginning with the so-designated 6 a.m. terminal of bank A and concluding with the 9 a.m. terminal of bank C. Thus, during each three-minute interval in the selected three-hour period, a different one of the selector terminals is marked, as by ground potential. Each of these terminals is suitably wired to a single terminal of one or more of forty dial-type switches SW1 to SW40, only seven of which appear at the left of Figs. 9 and 11. Each of these dial-type switches is manually settable to any one of twenty-four time-designated positions or terminals, so that each such switch accounts for twenty-four time settings, such as 6:00 a.m., 6:30 a.m., 6:33 a.m., 6:36 a.m., etc., each terminal of a switch accounting for one particular setting.

Figure 2:
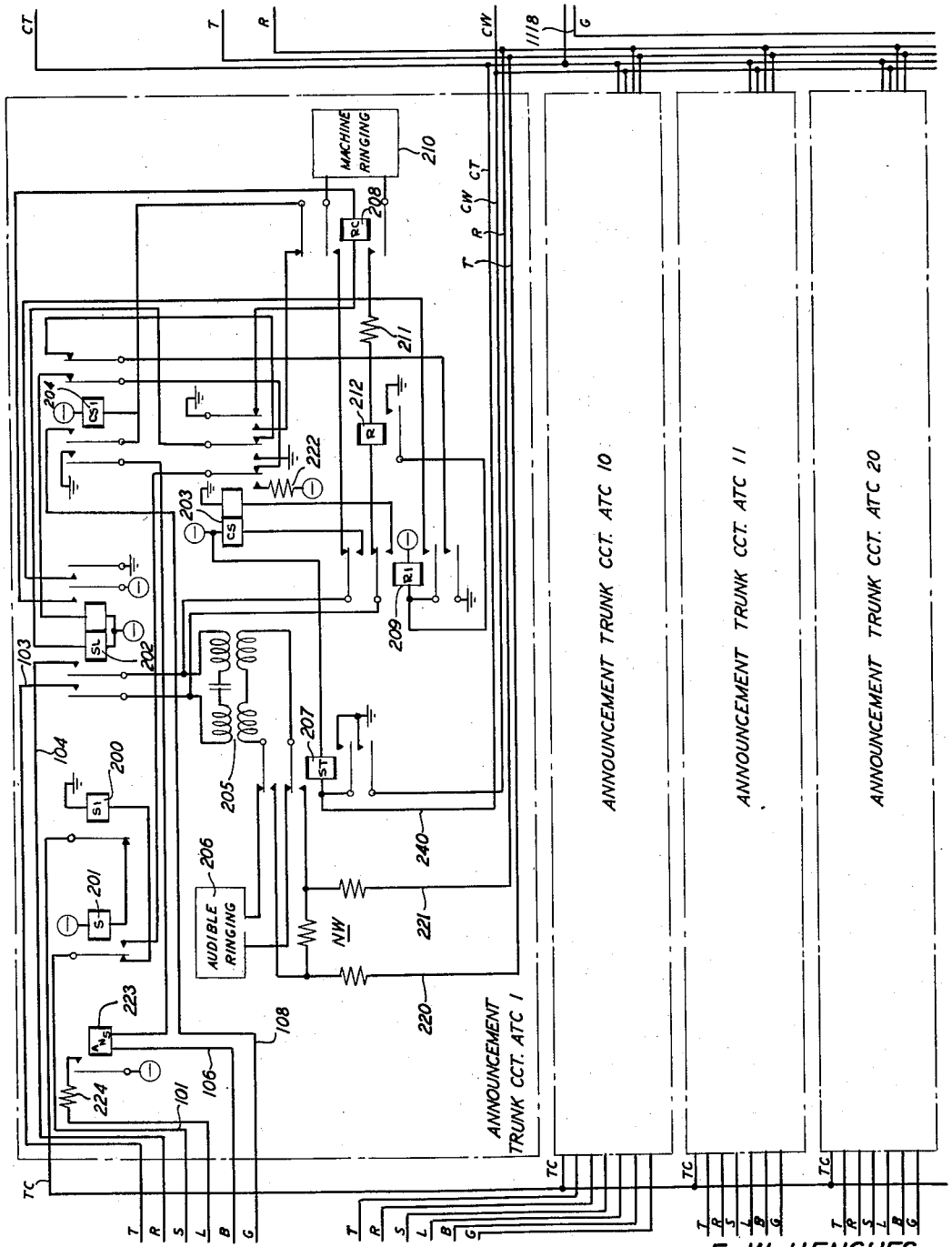
Figure 6:
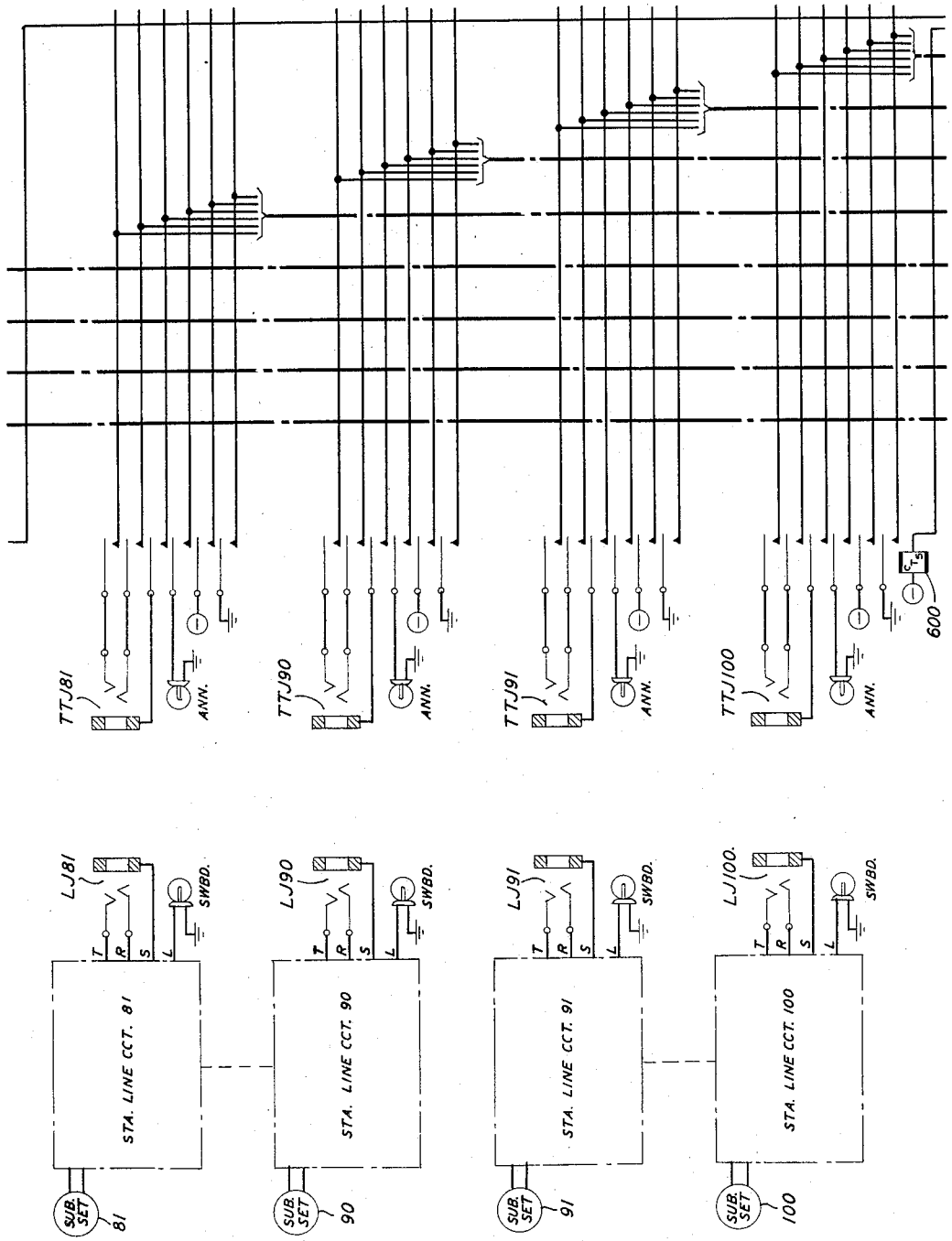
Figure 8:
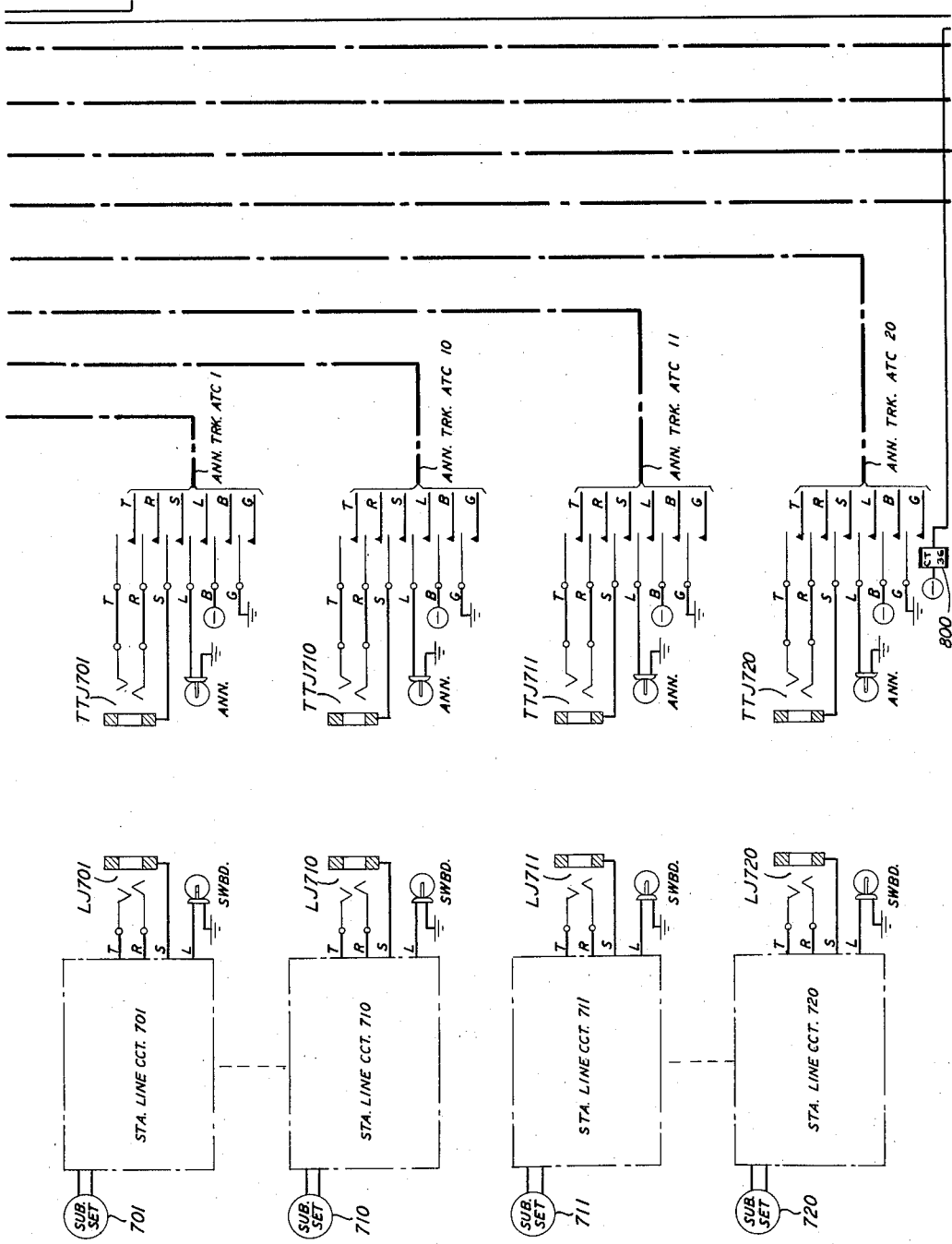
Figure 10:
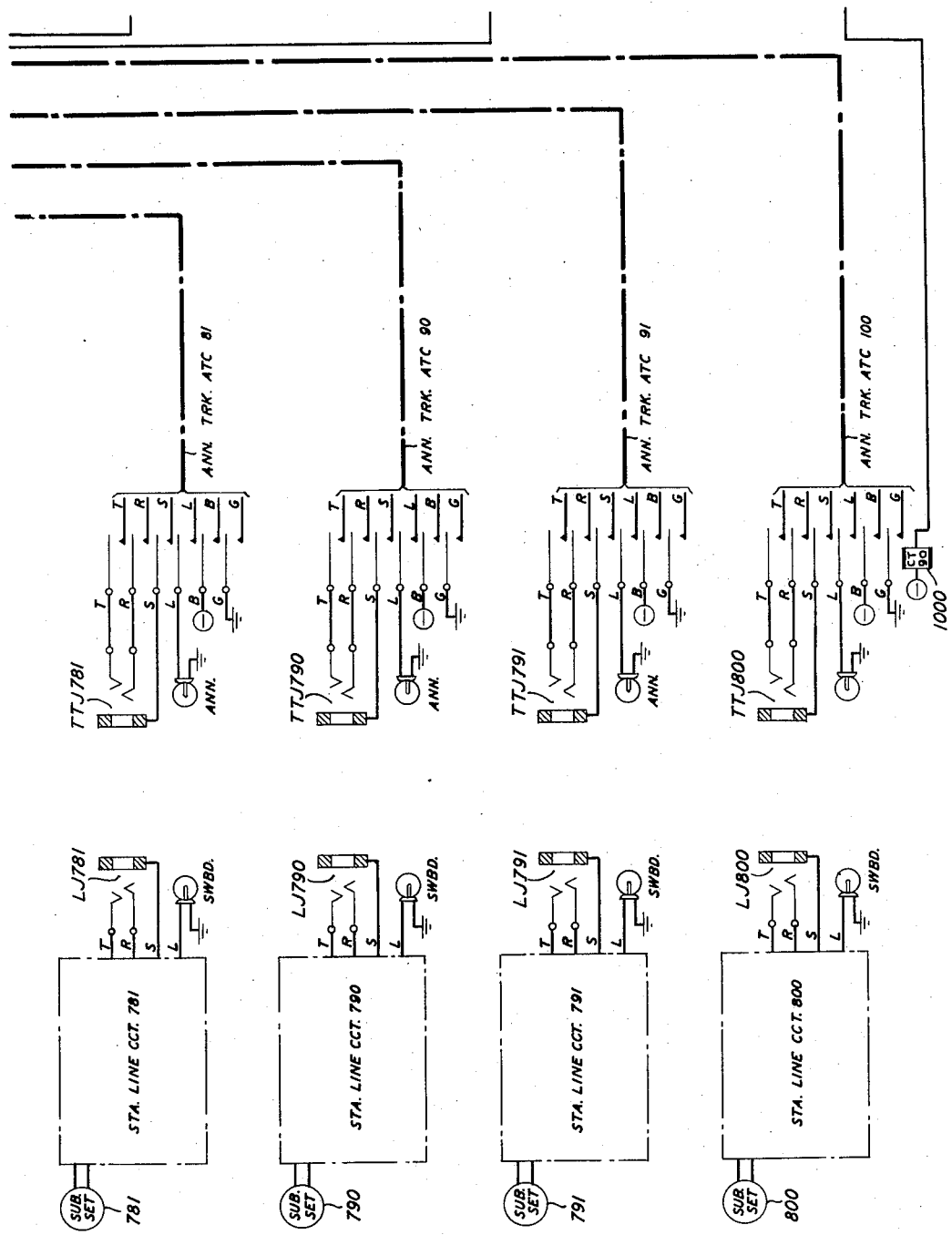

The wiper of each dial-type time switch is electrically connected to the winding of one of forty switching relays, such as relays 900, 905, 906, 907, 1120, 1121 and 1122. Each such relay therefore, operates at a time, in the three-hour interval, which is determined by the setting of its associated dial switch, and in operating, completes an energizing circuit to a corresponding one of forty multicontact relays, such as relays 100, 600, 800 and 1000 (Figs. 1, 6, 8 and 10). Each such relay functions, when operated, to cut through twenty time trunk jacks, such as jacks TTJ1–TTJ20 (Fig. 1) to a corresponding number of time trunk circuits such as time trunk circuits ATC1–ATC20 (Fig. 2). In the drawings, Figs. 6, 8 and 10 are substantial duplicates of Fig. 1 and, with Fig. 1, are intended to represent eight hundred time trunk jacks TTJ1 to TTJ800, only sixteen of which actually appear on the drawings. It is now apparent that, if each of the forty dial-type time switches SW1–SW40 is set on a particular time-designated contact, and assuming each is set upon a contact having a different time designation, all of the eight hundred trunk jacks TTJ1–TTJ800, will be cut through to announcement trunk circuits ATC1–ATC100 sometime during the three-hour interval and, under the assumed conditions, such cut throughs will be effected successively in groups of twenty. Under the assumed conditions, only twenty jacks TTJ would be cut through during any one three-minute period but, it is understood that, in practice, conditions would be encountered which would require more than twenty such jacks to be simultaneously cut through to the announcement trunk circuits, in which event more than one dial-type switch SW would be given the same time setting. An extreme condition not likely to be encountered in practice would require all eight hundred jacks to be cut through at the same time, in which case, all forty of the dial-type switches would necessarily have to be set at the same time-designated position. This condition also would necessitate the use of eight hundred announcement trunk circuits.

In order to preclude the necessity for providing one announcement trunk for each time trunk jack and to reduce the number of announcement trunks required, each trunk is multipled, in the exemplary embodiment, to eight time trunk jacks. This multiple arrangement is indicated in the drawings by the broken lines extending between Figs. 1 and 8 and between Figs. 6 and 10. In this fragmentary showing, only two time trunk jacks are illustrated as being connected in multiple, because of space limitations. For example, time trunk jacks TTJ1 and TTJ701 are shown connected in multiple to the announcement trunk ATC1. It is understood that the multiple connections to announcement trunk ATC1 would, in practice, include also time trunk jacks TTJ101, TTJ201, TTJ301, TTJ401, TTJ501 and TTJ601 (not shown). Similarly, announcement trunk ATC10 is shown connected in multiple to time trunk jacks TTJ10 and TTJ710 whereas, in practice, this trunk would serve also time trunk jacks TTJ110, TTJ210, TTJ310, TTJ410, TTJ510 and TTJ610 (not shown). Each of the remaining ninety-eight trunks would similarly serve a group of eight time trunk jacks.

At the extreme left of Figs. 6, 8 and 10 are schematically shown sixteen of a group of eight hundred station line circuits, each interconnecting a substation and its jack termination at the switchboard in the private branch exchange. These line jacks, LJ1–LJ800, in practice, occupy an end position on a multiposition switchboard and are a part of the regular switchboard multiple, while the time trunk jacks TTJ1–TTJ800 constitute a patching panel conveniently mounted on the top of this switchboard end position so as to facilitate connections to be made between any of the time trunk jacks and any of the line jacks through the medium of patching cords, such as are shown, for example, at PC1 and PC10. Any of the station line circuits which are connected to time trunk jacks by way of patching cords, such as cords PC1 and PC10 will, if idle, be cut through to announcement trunk circuits such as trunk circuits ATC1, ATC10, etc., when the time trunk jacks are cut through, as described, and will respond to the control of such trunk circuits in a manner to be set forth in detail hereinafter. Suffice it to say, at this time, that the telephone ringers corresponding to such cut through station line circuits are automatically operated.

Figure 3:
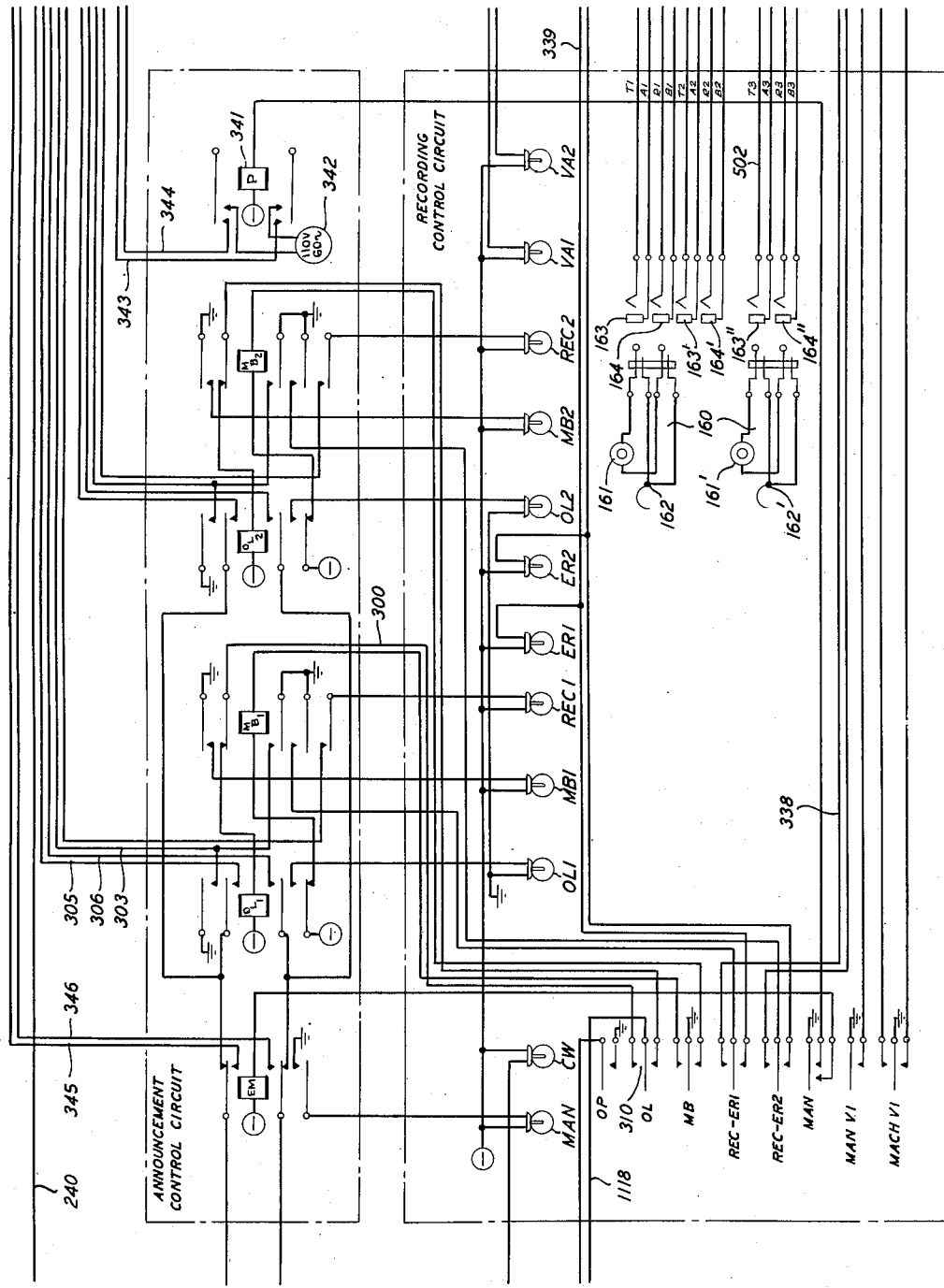
Figure 4:
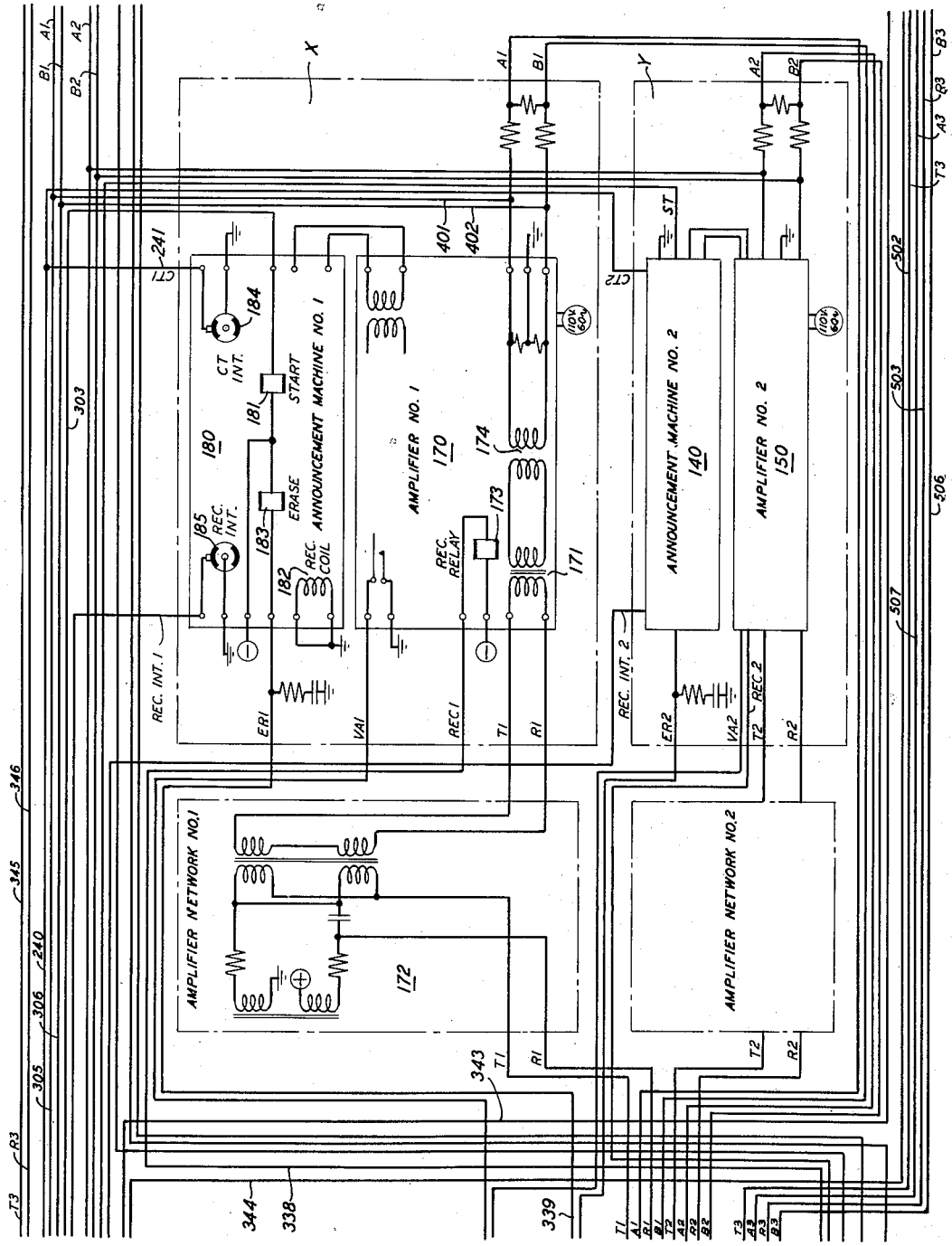
Figure 5:
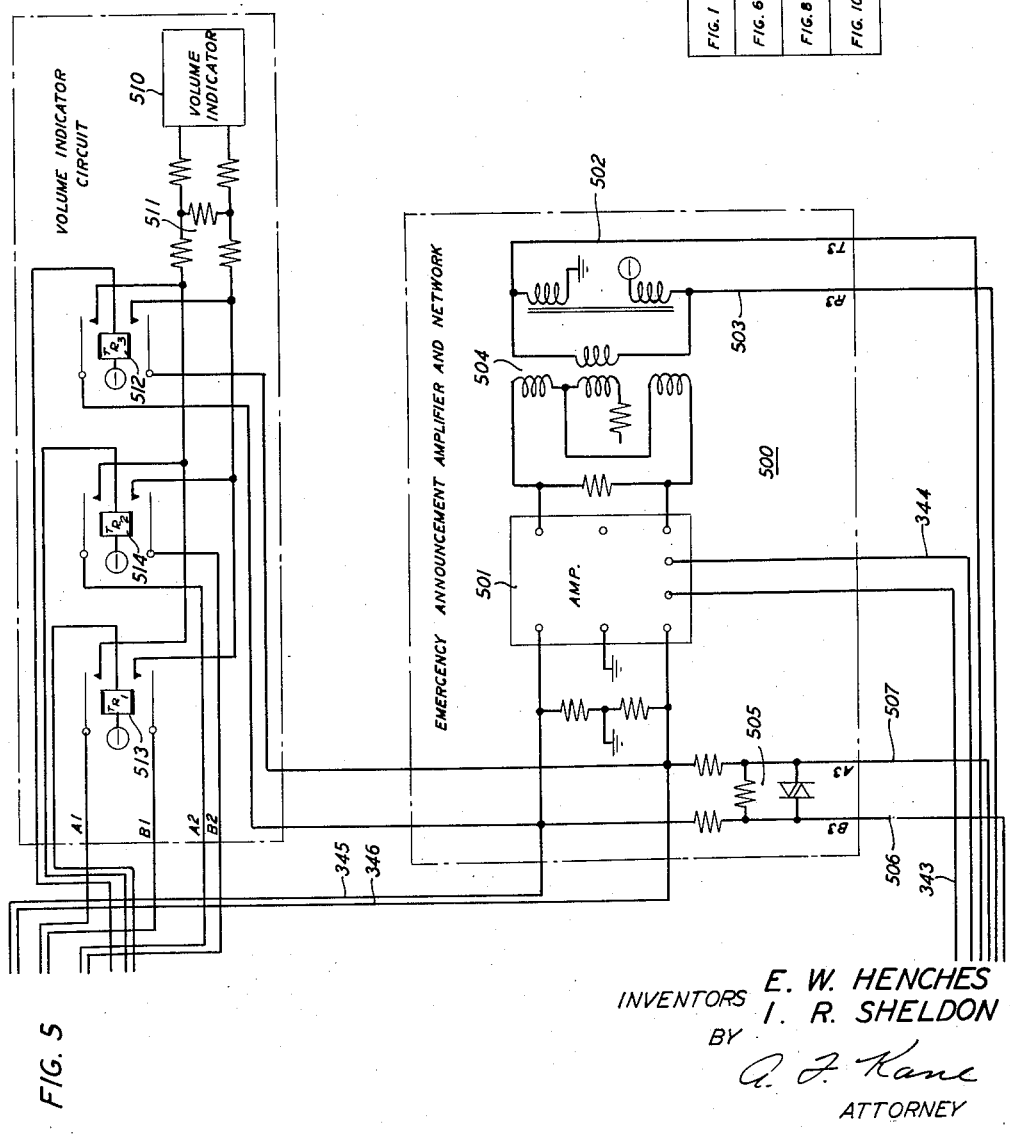
Figure 7:
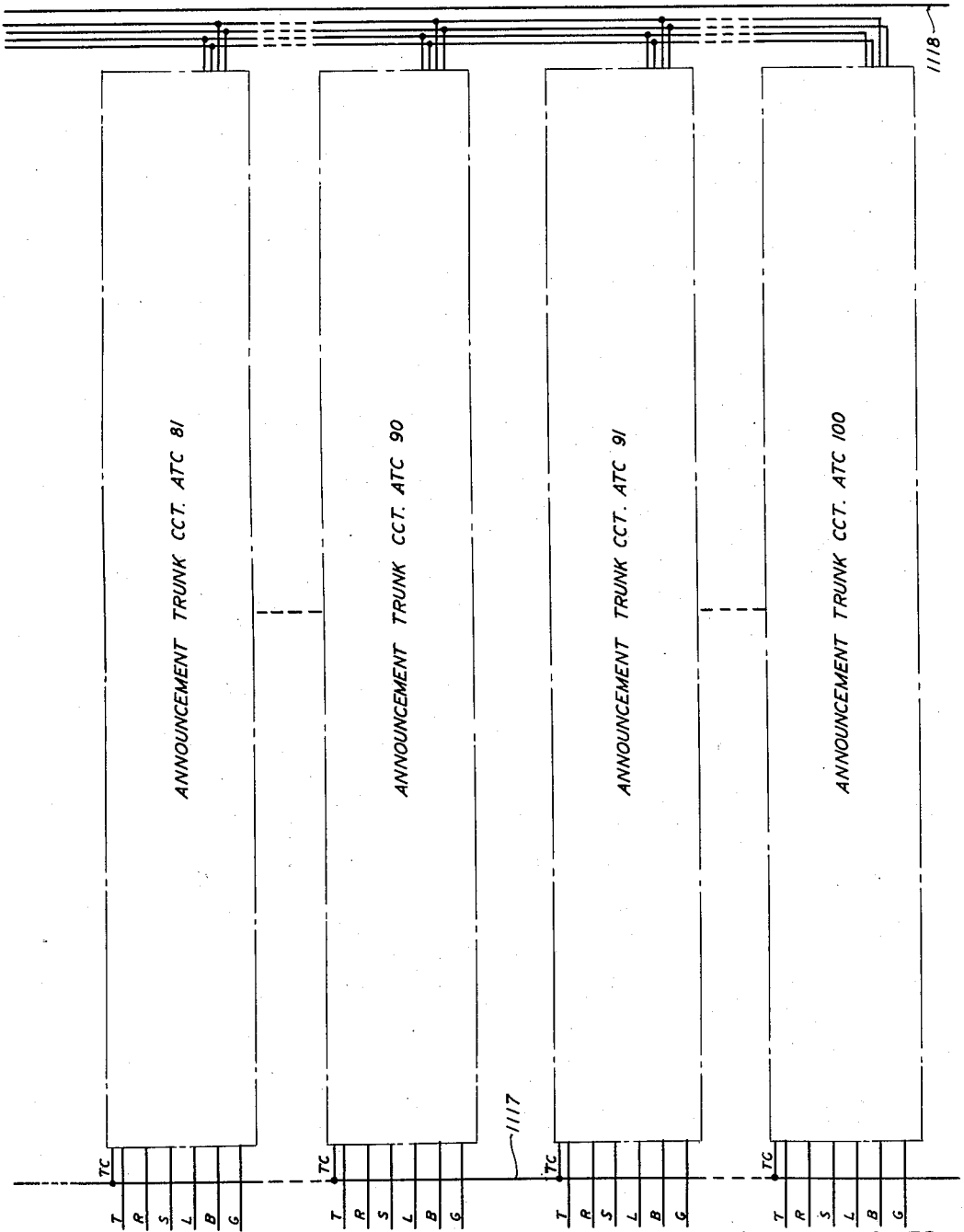

It is not deemed necessary, at this time, in view of the detailed description to follow, to dwell any further on the general layout of the circuitry and apparatus involved in the morning call system of this invention, nor to describe events which follow the response of the alerted guests. Figs. 3, 4 and 5 of the drawings, however, will now be described. Fig. 3, in the upper broken line enclosure, discloses schematically an announcement control circuit which is common to the one hundred announcement trunk circuits ATC1–ATC100 indicated in Figs. 2 and 7, while the lower broken line enclosure illustrates, schematically, equipment which may be located in a "quiet room" at the private branch exchange and which is employed to determine which of two announcement machines and their associated amplifiers are to be used; to visually record conditions as they occur in the operation of the system; to permit the substitution of emergency oral announcements for the automatic announcement machines as conditions require; and to record announcement messages on the recording medium of the announcement machine and to erase the same. Fig. 4 shows schematically a pair of announcement machines and their associated amplifiers, and Fig. 5 shows schematically a volume indicator circuit and an emergency amplifier and network.

Referring now particularly to Figs. 3 and 4, the latter shows two announcement machine units of the electromagnetic type, the upper unit X being shown in skeletonized detail and the lower unit being shown in block diagram. Duplicate announcements are recorded on the two announcement machines 180 and 140, one machine being in the "on line" or announcement condition and the other being in "standby" condition. Each announcement machine has associated therewith an amplifier unit and includes a recorder-reproducing machine, controls relays and keys, indicating lamps and jacks for use in establishing a recording or a monitoring connection between an amplifier unit and attendant's telephone sets, such as indicated at 160. The amplifier unit 170 comprises a recording coil 171, an amplifier network 172, a relay 173 controlling the connections of the amplifier for recording and announcement purposes, and an announcement output coil 174. The announcement machine No. 1 or recorder-reproducer unit 180 comprises, in addition to the motor means and record tape (neither of which is shown), a start relay 181, a recording coil 182, an erasing head (not shown), an erase magnet 183 controlling the movement of the erasing head, and two interrupters 184 and 185 for generating control impulses.

Fig. 3 shows a pair of attendant's telephone sets 160 each comprising a transmitter 161 or 161' and a receiver 162 or 162', telephone jacks 163 and 164 and 163' and 164' and an auxiliary pair of jacks 163" and 164". The last pair of jacks are associated with the emergency announcement amplifier and network unit 500, Fig. 5, the purpose of which will be indicated hereinafter. A key OL provides for the manual control of the transfer of the two announcement machines and amplifier units from "standby" to "on line" condition, the upper position of the key being identified with the "on line" condition of unit No. 1 and the lower position being identified with the "on line" condition of unit No. 2. A key MB is employed to place either of the units in maintenance or busy condition. A key REC–ER1 determines the recording and erasing conditions of the unit No. 1, while a key REC–ER2 serves the same purpose with respect to unit No. 2. Keys MAN and OP are employed when orally transmitted announcements are to be substituted for the machine announcements on an emergency basis. Keys MANB1 and MACHB1 are used when the volume indicator 510, Fig. 5, is to be employed during orally transmitted messages and machine messages respectively. Lamps OL1, MB1, REC1 and ER1 indicate on line, make busy, recording and erase conditions, respectively, of unit No. 1, while similar letter designations followed by the numeral 2 identify corresponding lamps associated with unit No. 2. Lamps VA1 and VA2 are associated, respectively, with amplifier No. 1 and amplifier No. 2 and each is controlled by a thermostatic switch VA which operates when the corresponding amplifier completes its warm-up period. Lamp CW provides a call waiting signal while the lamp MAN is lighted when the emergency announcement equipment is in use.

The interrupter 184 functions to control the operation of start relays 207 of the announcement trunk circuits in a manner such that the extension line circuits are cut through to an announcement machine only at the start of an announcement period, thus insuring the transmission of a complete announcement to an answering guest. Interrupter 185 which is synchronized with interrupter 184 controls the circuit of relay REC1 so as to cause this lamp to be lighted to identify the announcement machine which is being used for recording purposes.

In order to render the description of the operation of the disclosed system complete and to otherwise simplify its understanding, the following tabulation is offered as a sample case which could be typical of a convention morning at a large hotel. The sample case assumes seven hundred six guests who have requested morning call service at the following times:

| Requested Time (a.m.): | No. guests |
| --- | --- |
| 6:00 | 15 |
| 6:30 | 10 |
| 6:45 | 18 |
| 7:00 | 35 |
| 7:15 | 50 |
| 7:30 | 475 |
| 7:45 | 20 |
| 8:00 | 38 |
| 8:15 | 20 |
| 8:30 | 12 |
| 8:45 | 8 |
| 9:00 | 5 |

When this information has been received, an operator or other telephone personnel prepares a master list tabulating the number of guests to be awakened or alerted, and the times at which they are to be alerted; assigns patching jacks by groups of twenty, starting at 6:00 a.m.; and assigns the settings of the dial-type switches. The tabulation of such a sample case could take the following form:

| Requested Time (a.m.) | Number of Guests | Time Trunk Jacks | Time Switch | Time Setting |
|---|---|---|---|---|
| 6:00 | 15 | 1-15 | 1 | 6:00 |
| 6:30 | 10 | 21-30 | 2 | 6:30 |
| 6:45 | 18 | 41-58 | 3 | 6:45 |
| 7:00 | 20 | 61-80 | 4 | 7:00 |
| 7:00 | 15 | 81-95 | 5 | 7:00 |
| 7:15 | 20 | 101-120 | 6 | 7:15 |
| 7:15 | 20 | 121-140 | 7 | 7:15 |
| 7:15 | 10 | 141-150 | 8 | 7:15 |
| 7:30 | 20 | 161-180 | 9 | 7:24 |
| 7:30 | 20 | 181-200 | 10 | 7:24 |
| 7:30 | 20 | 201-220 | 11 | 7:24 |
| 7:30 | 20 | 221-240 | 12 | 7:24 |
| 7:30 | 20 | 241-260 | 13 | 7:24 |
| 7:30 | 20 | 261-280 | 14 | 7:27 |
| 7:30 | 20 | 281-300 | 15 | 7:27 |
| 7:30 | 20 | 301-320 | 16 | 7:27 |
| 7:30 | 20 | 321-340 | 17 | 7:27 |
| 7:30 | 20 | 341-360 | 18 | 7:27 |
| 7:30 | 20 | 361-380 | 19 | 7:30 |
| 7:30 | 20 | 381-400 | 20 | 7:30 |
| 7:30 | 20 | 401-420 | 21 | 7:30 |
| 7:30 | 20 | 421-440 | 22 | 7:30 |
| 7:30 | 20 | 441-460 | 23 | 7:30 |
| 7:30 | 20 | 461-480 | 24 | 7:33 |
| 7:30 | 20 | 481-500 | 25 | 7:33 |
| 7:30 | 20 | 501-520 | 26 | 7:33 |
| 7:30 | 20 | 521-540 | 27 | 7:33 |
| 7:30 | 20 | 541-560 | 28 | 7:33 |
| 7:30 | 20 | 561-580 | 29 | 7:36 |
| 7:30 | 20 | 581-600 | 30 | 7:36 |
| 7:30 | 20 | 601-620 | 31 | 7:36 |
| 7:30 | 15 | 621-635 | 32 | 7:36 |
| 7:45 | 20 | 641-660 | 33 | 7:45 |
| 8:00 | 20 | 661-680 | 34 | 8:00 |
| 8:00 | 18 | 681-698 | 35 | 8:00 |
| 8:15 | 20 | 701-720 | 36 | 8:15 |
| 8:30 | 12 | 721-732 | 37 | 8:30 |
| 8:45 | 8 | 741-748 | 38 | 8:45 |
| 9:00 | 5 | 761-765 | 39 | 9:00 |

Patching cords are then employed to interconnect the line jacks of the concerned stations with time trunk patching jacks in accordance with the information on the tabulated master sheet.

In the following detailed description of the operation of the morning call system disclosed in the drawings, it will be assumed, for descriptive purposes, that only ninety-eight guests have requested morning call service and that such calls are grouped in the following manner, and in accordance with a partial tabulation of the master sheet applicable to the sample case referred to above; 15 calls for 6:00 a.m.; 10 calls for 6:30 a.m.; 18 calls for 6:45 a.m.; 35 calls for 7:00 a.m.; and 20 calls for 8:15 a.m. In accordance with the tabulations of the master sheet, the 6:00 a.m. calls are assigned to fifteen time trunk jacks of the first group of twenty jacks, that is, to time trunk jacks TTJ1 to TTJ15; the 6:30 a.m. calls to ten time trunk jacks of the second group of twenty jacks, that is, to time trunk jacks TTJ21 to TTJ30; the 6:45 a.m. calls to eighteen time trunk jacks of the third group of twenty jacks, that is, to time trunk jacks TTJ41 to TTJ58; the 7:00 a.m. calls to the fourth and fifth groups of twenty jacks, that is, to time trunk jacks TTJ61 to TTJ80, and to time trunk jacks TTJ81 to TTJ96; and the 8:15 a.m. calls to the thirty-sixth group of twenty trunks, that is, to time trunk jacks TTJ701 to TTJ720. The line jacks of those extension stations that are to be signaled at 6:00 a.m. are connected indiscriminately, by way of suitable patching cords, to time trunk jacks TTJ1 to TTJ15; those of the extension stations that are to be signaled at 6:15 a.m. are connected indiscriminately, by way of suitable patching cords, to time trunk jacks TTJ21 to TTJ30; etc., and the dial-type switches SW1 to SW5 and SW36 are set at their 6:00 a.m., 6:30 a.m., 6:45 a.m., 7:00 a.m., and 8:15 a.m. terminals, respectively, it being observed that switches SW4 and SW5 are both set on the 7:00 a.m. terminal. Upon completion of the cord connections and of the settings of the dial-type switches, the system is ready to operate automatically when triggered by the time switch 1100 at 6:00 a.m.

It will be further assumed that announcement machine No. 1 (Fig. 4) is in operating condition and will be employed, announcement machine No. 2 serving as a standby. Key OL of Fig. 3, therefore, will be actuated to its upper position to effect the closure of contacts 310 and thereby to enable announcement machine No. 1.

In the normal unoperated condition of selector switch SLS, the brushes of terminal banks A, C and E are resting on the first bank terminal which, insofar, as bank A is concerned, is the 6:00 a.m. position. The brushes of terminal banks B, D and F are 180 degrees out of phase with the brushes of banks A, C and E.

The master clock 1100 (Fig. 11) functions automatically to close cam switch contacts 1101 at 6:00 a.m. and to open them at 9:03 a.m., thus defining a time interval of approximately three hours, actually an interval of three hours and three minutes. Immediately upon closure of contacts 1101, an obvious energizing circuit for synchronous motor 1104 is completed and the motor operates to drive cam shaft 1105. The shaft 1105 is so geared to the motor 1104 as to rotate at a speed of one revolution every three minutes. The motor and its associated cam shaft continue to operate during the time interval determined by cam 1102 of the master clock 1100. During this interval, ground potential is connected also to conductor 1118 leading to the announcement control circuit (Fig. 3) for a purpose to be described hereinafter.

The cams 1106, 1107 and 1108 are so configured and adjusted with respect to their respective cam springs that the contacts 1109 are closed immediately as the motor starts to operate; contacts 1110 are closed approximately two minutes and fifty-eight seconds later; and cam contacts 1111 are closed five seconds after the closure of contacts 1109. As the description progresses, it will become apparent that this delay in the closure of contacts 1111 provides a five-second interval during which an extension line over which a morning call signal is to be transmitted is tested to determine whether it is idle or busy. The cam 1108 is designed to close its associated contacts 1110 for a period of two seconds in every three-minute cycle, that is, the contacts 1110 are closed for two seconds and are open for two minutes and fifty-eight seconds. The cam 1107 is designed to close its associated contacts 1109 and maintain them closed for two minutes and thirty seconds in each three-minute period, while cam 1106 is designed to close contacts 1111 and maintain them closed for two minutes and twenty-five seconds in each three-minute interval.

When, at 6:00 a.m., contacts 1109 close under control of cam 1107, a circuit is completed which includes ground at the closed contacts 1109, conductor 1113, inner armature and back contact of relay 901, conductor 902, outer upper armature and back contact of relay 903, conductor 904, brush of terminal bank A of selector switch SLS and the 6:00 a.m. terminal thereof, conductor 1115, the 6:00 a.m. terminal of dial switch SW1 and its associated brush, winding of relay 900, and negative battery. Relay 900 operates in this circuit and completes an obvious operating circuit for multicontact relay 100 (Fig. 1). Relay 100 operated, extends the tip, ring, sleeve, lamp, battery, and ground leads T, R, S, L, B, and G, respectively, of the twenty time trunk jacks TTJ1 to TTJ20 to corresponding leads of a corresponding number of announcement trunk circuits ATC1 to ATC20, only trunk ATC1 of which is shown in detail. Thus, in the described embodiment of the invention, all of the time trunk jacks of the first group of twenty jacks are associated with corresponding announcement trunk circuits ATC1 to ATC20, respectively, at 6:00 a.m., with the result that all of the fifteen line jacks LJ1 to LJ15 associated with the extension stations which requested morning call service at 6:00 a.m. are now associated with announcement trunks by way of the now enabled time trunk jacks TTJ1 to TTJ15 and the associated patching cords PC1 to PC15, only two of which appear in the drawing. It is to be understood that, in the situation being described, there would be no cord connectors associated with the time trunk jacks TTJ16 to TTJ20. It will be understood also that had there been more than 20 extension stations requiring morning call service at 6:00 a.m., more than one dial switch, such as switch SW1, would be set at its 6:00 a.m. terminal to cause the operation of more than one multicontact relay, such as relay 100, it being noted that all similarly time-designated terminals of the dial switches are wired to the corresponding terminals of the banks A, B and C of selector switch SLS.

The description which immediately follows is addressed to the operation of the system insofar as one particular substation, such as substation No. 1, is concerned. The system functions in the same manner with respect to the other substations of the group embracing stations Nos. 1 to 15, inclusive, which have been assumed to constitute the group of substations to be signaled at 6:00 a.m.

Should it happen that the party at substation No. 1 is using the telephone thereat at 6:00 a.m. either on an incoming call or on a call originated at the substation, the multiple line jack MLJ1 associated therewith would have an operator's cord, indicated by the designation OC, connected thereto so that battery potential from the cord would be connected to the sleeve of the multiple line jack MLJ1 and also to the sleeve of the line jack LJ1. Thus, on a busy condition of the line associated with substation No. 1, relay 200 in the now connected announcement trunk circuit ATC1 operates in a circuit which includes battery on the sleeve contacts of jacks MLJ1 and LJ1, sleeve conductor of patching cord PC1, sleeve contact of time trunk jack TTJ1, the corresponding armature S and front contact of multicontact relay 100, sleeve conductor 101 of the announcement trunk circuit ATC1, armature and back contact of relay 201, winding of relay 200, and ground. Relay 200 is operated in this circuit and opens the operating circuit to relay 201. It will be recalled that five seconds after the closure of cam contacts 1109 (Fig. 11), cam contacts 1111 are closed, so that relay 1116 is operated under control of cam 1106 after the lapse of five seconds following the operation of multicontact relay 100. The operation of relay 1116 results in the connection of ground potential to conductor 1117 which is associated with, and controls the operation of a corresponding sleeve relay, such as relay 201, in each of the announcement trunk circuits. In practice, there would be a multiplicity of relays 1116, each controlling a plurality of armatures which simultaneously apply ground potential to a corresponding number of conductors 1117 each of which serves one announcement trunk. For simplicity of disclosure, the single relay 1116 illustrated, is used to serve all of the announcement trunk circuits of the system by way of the single conductor 1117. Therefore, the ground which is connected to the winding of sleeve relay 201 in announcement trunk ATC1 by way of conductor 1117 is ineffective to cause the operation of relay 201 because of the operated condition of relay 200 which identifies the busy condition of the line circuit associated with substation No. 1. It is during the five-second interval preceding the closure of cam contacts 1111 that the lines to be signaled are tested. Ground is held on conductor 1117 for an interval of two minutes and 25 seconds so that, should the line associated with substation No. 1 become idle during this interval, the signaling operation would proceed immediately upon the line becoming idle. Thus, with sleeve relay 201 unable to operate, the signaling of the busy station No. 1 is impossible.

It will now be assumed that the line associated with substation No. 1 is idle, in which case ground potential appears on the sleeve contact of line jack LJ1 by way of the winding of cut-off relay 102, so that relay 200 in the announcement trunk circuit ATC1 is in its unoperated condition. Therefore, when relay 1116 operates under control of cam 1106, as described, the resulting application of ground to conductor 1117 causes relay 201 to operate over an obvious circuit. At its armature and back contacts, relay 201 opens the operating circuit for relay 200, and at its front contacts, completes a circuit extending from battery, over the right winding of sleeve relay 202, back contact of inner right armature of relay 204, back contact of innermost right armature of relay 203, front contact and armature of relay 201, conductor 101, front contact and armature S of relay 100, sleeve contact of jack TTJ1, sleeve conductor of cord PC1, sleeve contact of jack LJ1, winding of cut-off relay 102, to ground. Relay 202 operates in this circuit as does also relay 102, the latter opening the circuit to line relay 105.

At its two left armatures and front contacts, relay 202 extends the tip and ring conductors 103 and 104 of the announcement trunk ATC1 to the secondary windings of repeating coil 205, the primary windings of which are connected to the audible ringing source 206 by way of the upper armatures and back contacts of relay 207. The purpose of this audible ringing source will be set forth hereinafter. At its inner right armature and front contact, relay 202 completes an operating circuit for relay 208 which includes the winding of this relay, the back contact and outermost armature of relay 203, and ground. At its outer right armature and front contact, relay 202 prepares a locking circuit for relay 209.

Relay 208, operated, opens the operating circuit to relay 204, and at its lower and inner upper armatures and front contacts, connects the machine ringing source 210 to the tip and ring conductors 103 and 104 of the established connection by way of resistor 211, winding of tripping relay 212, the upper armatures and back contacts of relay 209 and the left armatures and front contacts of relay 202. Current from the source 210 traverses the connection to the substation No. 1 and operates the ringer thereat, in well known manner, as a morning call signal.

It will be understood that the ringers at all idle stations Nos. 1 to 15 will operate simultaneously at 6:00 a.m. under control of the corresponding announcement trunk circuits in the manner just described, it having been assumed, for descriptive purposes, that the lines of these stations are cord-connected to the time trunk jacks TTJ1 to TTJ15 by multicontact relay 100, and that multicontact relay 100 is controlled by dial switch SW1 which is set at its 6:00 a.m. terminal.

When the party at station No. 1 answers a morning call signal manifested by the operation of the associated ringer, relay 212 in the announcement trunk circuit operates as a tripping relay, in well known manner, and completes an obvious operating circuit for relay 209. Relay 209 operates in this circuit and locks operated under control of relay 202 in a circuit which includes battery, the winding, inner lower armature and front contact of relay 209, front contact and right outer armature of relay 202, and ground. Relay 209, operated, disconnects the machine ringing source 210 from the tip and ring conductors 103 and 104 and releases relay 212.

The windings of relay 203 are now connected across the tip and ring conductors 103 and 104 by way of the front contacts and upper armatures of relay 209 and the front contacts and left armatures of relay 202. Relay 203 accordingly, operates over the closed station loop at substation No. 1. Relay 203, at its left armature, prepares an operating circuit for relay 207 which is completed under control of interrupter 184 of the announcement device No. 1, as will be described hereinafter. It will be noted at this time that, so long as relay 207 is unoperated, the source 206 of audible ringing is connected to the tip and ring conductors 103 and 104, in order to subject the subscriber's receiver at substation No. 1 to current from this source and to thereby produce an audible signal until such time as the announcement device functions to start transmitting its message. Without such an expedient, the subscriber upon answering the morning call signal and finding nothing at all on the connection, might conclude that his telephone was signaled in error or accidentally, and restore the handset to its mounting before the announcement message is put on the connection.

Reverting back to the operation of cam contacts 1101 of the master time switch, it will be observed, as previously indicated, that simultaneously with the closure of the circuit to motor 1104, ground potential is connected to conductor 1118 and is extended over the upper contacts 310 of manually operable key OL, conductor 300, the inner upper armature and back contact of relay 301, winding of relay 302, to battery. Relay 302 operates in this circuit and, at its lower armature and front contact, completes an obvious energizing circuit for the lamp OL1 to indicate in the "quiet room" that it is the No. 1 announcement machine which is in service or "on line." At its outer upper armature and front contact, relay 302 completes a circuit including ground, the outer upper armature and front contact of relay 302, conductor 303, winding of start relay 181 of announcement machine No. 1, and battery. At its inner upper and lower armatures, relay 302 extends the tip and ring conductors 220 and 221 from the network NW, Fig. 2, to conductors 305 and 306, respectively, and thence to the output of amplifier No. 1 by way of conductors 401 and 402.

The start relay 181 operates, as described, to set the announcement machine No. 1 in operation in any well known manner, so that the prerecorded message thereof will be transmitted by way of the output leads 401 and 402 of amplifier No. 1, conductors 305 and 306, the front contacts and upper and lower armatures of relay 302, the back contacts and inner lower armatures of relay 307, conductors 220 and 221, network NW, front contacts and upper armatures of relay 207, repeating coil 205, left armature and front contacts of relay 202, tip and ring conductors 103 and 104 of announcement trunk ATC1, front contacts and armatures T and R of multicontact relay 100, corresponding terminals of jack TTJ1, tip and ring conductors of patching cord PC1, tip and ring contacts of jack LJ1, to the telephone set at substation No. 1. This message may take any appropriate form as hereinbefore indicated. The transmission of this message is effected when relay 207 operates. It will be recalled that an operating circuit for this relay is prepared when relay 203 operates. This circuit is completed at the contacts of interrupter 184 which, as previously described, insures cut through of the extension line to the announcement machine at the beginning of a message announcement period. The completed circuit includes conductors 240 and 241. When relay 207 operates, an obvious energizing for "call waiting" lamp CW is completed. Relay 207 locks operated under control of relay 203.

With relay 203 operated, as previously described, a circuit is completed from battery, over resistor 222, the front contact and innermost right armature of relay 203, front contact and armature of relay 201, conductor 101, front contact and armature S of multicontact relay 100, sleeve contacts of jack TTJ1, sleeve conductor of cord PC1, sleeve contact of jack LJ1, winding of cut-off relay 102, to ground. Relay 102 is held operated in this circuit and keeps the windings of line relay 105 disconnected from the line extending to the substation No. 1.

At its middle right armature, relay 203 completes a holding circuit for relay 202 which includes battery, the left winding of relay 202, the middle right armature and front contact of relay 203, and ground. At its outermost armature and front contact, relay 203 opens the operating circuit for relay 208 so that this relay is deenergized and restores its armatures. Relay 204 now operates in a circuit extending from battery, over the winding of relay 204, the outer upper armature and back contact of relay 208, the front contact of outermost right armature of relay 203, to ground.

Relay 204, at its outer left armature and front contact, causes relay 223 to operate in a circuit which may be traced from battery, over armature B of multicontact relay 100, conductor 106, winding of relay 223, outer left armature and front contact of relay 204 to ground. Relay 223, operated, completes an obvious energizing circuit for announcement trunk or answer lamp 107 which includes resistor 224 and armature L and front contact of multicontact relay 100. At its inner left armature and front contact, relay 204 completes a locking circuit for itself which includes conductor 108 and ground at the front contact and armature G of relay 100.

When the party at substation No. 1 restores the telephone handset to its support after having received the morning call announcement, relay 203 is released because of the opening of the line loop at the substation. Relay 207 thereupon releases, as do also relays 202 and 209. The substation cut-off relay 102 also releases incident to the release of relay 203, so that the substation line circuit is restored to normal condition and the extension line is ready for normal use since the operate path of sleeve relay 202 is held open at the inner right armature and front contact of relay 204 which relay, as described, is locked up under the direct control of multicontact relay 100.

Thirty seconds before 6:03 a.m., cam 1107 functions to remove ground from conductor 1113 and thence from the 6:00 a.m. terminal of bank A of rotary switch SLS. Ground is thus removed from the 6:00 a.m. terminal of all of the dial switches including dial switch SW1, with the consequent release of relay 900, and also of the corresponding multicontact relay 100. With relay 100 released, all operated relays 223 and 204 are restored to normal.

The foregoing description has been directed particularly to the operation of the system insofar as substation No. 1 and the controls exercised by the announcement trunk circuit ATC1 with respect to the substation, are concerned. It is apparent that other substations Nos. 2 to 16 are signaled in the identical manner under control of the announcement trunks ATC2 to ATC16, simultaneously at 6:00 a.m. if their corresponding station line circuits test idle at that time, or individually at some other time within an interval of two minutes and twenty-five seconds following 6:00 a.m., if their station line circuits test busy at any time during such interval and become idle before the expiration of such interval. It is apparent also that each extension line circuit of any one group of twenty such circuits is serviced by a different announcement trunk and by ringing and message announcement equipments which are common to all of the announcement trunks. It is further apparent that the response of each subscriber or guest to a morning call signal is manifested in a positive manner at the switchboard by the lighting of an individual answer lamp, such as lamp 107, which signal is retired only at the conclusion of the two and one-half minute signaling interval in which it was lighted.

After two minutes and fifty-eight seconds have elapsed from the closure of cam contacts 1101 of master clock 1100, cam 1108 closes its contacts 1110 to complete an obvious operating circuit for stepping magnet 1112, which magnet thereupon functions to step selector switch SLS to its next, or 6:03 a.m. position. Since synchronous motor 1104 and the associated shaft 1105 make one revolution every three minutes, the operations described in connection with the 6:00 a.m. terminal of the selector switch is repeated at 6:03 a.m. and the switch continues this stepping procedure for the full three-hour morning call interval. Under the assumed conditions, that is, with the next set of morning calls to be made at 6:30 a.m., the selector switch SLS continues to step without effecting the transmission of any morning calls until the 6:30 a.m. terminal of bank A is reached. When this occurs, the 6:30 a.m. terminal of all of the dial switches having such a time designation are marked with ground potential from cam contacts 1109, but only dial switch 1102, the only one having its brush set on the 6:30 a.m. terminal, will be conditioned to cause the operation of its associated relay 905. Relay 905, operated, completes an operating circuit for a multicontact relay (not shown) which cuts through, in the manner of relay 100, a group of twenty time trunk jacks to a corresponding number of announcement trunk circuits. In accordance with the assumed plan, this relay cuts through time trunk jacks TTJ21 to TTJ40 (not shown) to announcement trunks ATC21 to ATC40 (not shown). Of this group of twenty time trunk jacks only ten, in accordance with the assumed plan, are connected to a corresponding number of line jacks identifying the substations Nos. 21 to 30 at which requests were made for morning call service at 6:30 a.m. These ten substations, therefore, if idle, are simultaneously rung at the requested time, or, if busy, in the manner described above in connection with the signaling of substation No. 1.

Under control of the selector switch SLS, the dial switch SW3, in accordance with the assumed plan, becomes conditioned at 6:45 a.m. to operate the associated relay 906; the dial switches SW4 and SW5 are conditioned at 7:00 a.m. to operate the associated relays 907 and 1120, respectively; and dial switch SW36 is conditioned at 8:15 a.m. to operate relay 1121. Relay 906 controls the operation of a multicontact relay (not shown), similar to relay 100, which functions to cut through time trunk jacks TTJ41 to TTJ60 (not shown) to a corresponding number of announcement trunks, so that the eighteen substations Nos. 41 to 58 (not shown) which are connected to time trunk jacks TTJ41 to TTJ58 by way of their respective line jacks and suitable patching cords, are signaled at 6:45 a.m. Relay 907 controls the operation of a multicontact relay (not shown) similar to relay 100, which functions to cut through time trunk jacks TTJ61 to TTJ80 (not shown) to a corresponding number of announcement trunk circuits, so that the twenty substations Nos. 61 to 80 (not shown) which are connected, according to the assumed plan, to time trunk jacks TTJ61 to TTJ80 by way of their respective line jacks and suitable patching cords are signaled at 7:00 a.m. Also at 7:00 a.m., relay 1120 operates to cause multicontact relay 600 (Fig. 6) to operate and cut through time trunk jacks TTJ81 to TTJ100 to announcement trunk circuits ATC81 to ATC100, to cause the fifteen substations Nos. 81 to 95 to be signaled, it having been assumed that only these fifteen substations, together with the twenty substations of the preceding group requested morning call service at 7:00 a.m. and therefore, would be the only substations whose corresponding line jacks are cord-connected to time trunk jacks of the group containing jacks TTJ81 to TTJ100. Relay 1121 operates at 8:15 a.m. to complete an operating circuit for multicontact relay 800 (Fig. 8) with the overall result that the twenty substations Nos. 701 to 720 are signaled and the guests thereat otherwise alerted at this time. It is understood that each answering guest is the recipient of the same prerecorded message.

The manner in which the terminals of banks A, B and C become successively marked under control of relays 901 and 903 and stepping magnet 1112 will now be described. It will be observed that the last terminal of terminal bank A of selector switch SLS bears the time designation 7:03 a.m. and that the first terminal of terminal bank B bears the time designation 7:06 a.m. During the first 180-degree cycle of operation of selector switch SLS the brushes of terminal banks B, D and F are open, due to phase position. The circuit through the brush of terminal bank C is open at the front contact and outer upper armature of relay 903, and the circuit through the brush of terminal bank E is open at the inner lower armature and front contact of relay 903. At 7:06 a.m. ground connection is made through the first terminal of bank B, as above indicated, so that now, because of phase position, the brushes of terminal banks A, C and E are open-circuited. The circuit through the brush of terminal bank D is open at the front contact and outermost lower armature of relay 901, while the circuit through the brush of terminal bank F is open because all terminals of this bank are open-circuited. Thus the selector switch SLS advances from the 7:06 a.m. terminal to the 8:06 a.m. terminal under control of stepping magnet 1112 in the same manner in which it was advanced from the 6:00 a.m. terminal to the 7:03 a.m. terminal. When the brush of bank B steps off the 8:06 a.m. terminal on to the last terminal, the brush of bank F closes ground through varistor 909 and the winding of relay 903 to battery, to cause relay 903 to operate. Relay 903, operated, locks in a circuit which includes battery, the winding, front contact and inner upper armature of relay 903, conductor 901, the back contact and outermost lower armature of relay 901, and ground.

Relay 903, at its outer upper armature, transfers the ground supplied by cam contacts 1109 from the first terminal of banks A and B to the first terminal of bank C. At its inner lower armature and front contact, relay 903 prepares an operating circuit for relay 901 which includes the brush of terminal bank E. At its outer lower armature and front contact, relay 903 completes an energizing circuit for stepping magnet 1112 which includes battery, the winding of magnet 1112 and its armature and back contact, resistor 1124, conductor 1123, outer upper armature and back contact of relay 901, front contact and outer lower armature of relay 903, brush of terminal bank F of selector switch SLS and ground at terminal 912 of terminal bank F. The switch SLS thus is stepped to the next position. The brush of bank C of switch SLS is, at this time, in engagement with the 8:09 a.m. terminal. The brushes of banks B, D and F are open due to phase position. The brush of bank A is open at the back contact and outer upper armature of relay 903 and, since the first 18 terminals of bank E are open, the brush thereof is open circuited. Operation of the selector switch continues normally until the brush of bank C reaches the 9:00 a.m. position when the last closure of cam contacts 1111 is made. Two seconds before 9:03 a. m. the selector switch is stepped to the next terminal which, at bank E is terminal 913, which is at ground potential. Relay 901 thereupon operates in a circuit which includes battery, the winding of relay 901, front contact and inner lower armature of relay 903, the brush of terminal bank E of selector switch SLS, and ground at contact 913. At 9:03 a.m., timing switch or master clock 1100 opens the circuit to motor 1104 and the cams 1106, 1107 and 1108 resume their normal starting positions.

It will be understood that, under the assumed plan, when brush of terminal bank C of selector switch SLS engages the 8:15 a.m. terminal, relay 1121 is energized by way of dial switch SW36 to effect the operation of multicontact relay 800, as previously mentioned. The latter relay functions to cut the time trunk jacks TTJ701 to TTJ720 through to announcement trunks ATC1 to ATC20, respectively, so that all twenty substations Nos. 701 to 720 are signaled in a manner which is now apparent.

Relay 901 operated, as described, locks up to ground from terminal bank E of selector switch SLS by way of its own innermost lower armature and front contact.

Stepping magnet 1112 now operates in a circuit which includes battery, the winding and armature contacts of magnet 1112, resistor 1124, conductor 1123, the middle and innermost lower armature contacts of relay 901, the brush of terminal bank E and terminal 913. At its outermost armature and back contact, relay 901 opens the locking circuit of relay 903 whereupon relay 903 releases. At its inner upper armature and back contact, relay 901 opens the ground lead 1113 from cam contacts 1109, and at its outermost lower armature and front contact, it applies ground potential to the brush of terminal bank D of selecor switch SLS.

Since terminals 913 to 914 of bank E of selector switch SLS are strapped to ground, the selector switch will continue stepping until the brush of terminal bank D rests on its first terminal 915. All terminals of bank D are strapped together so that when the associated brush reaches terminal 915, ground from this brush is closed through to hold relay 901 operated over its middle lower armature contacts. This same ground keeps magnet 1112 energized so that the selector switch SLS continues to step until it reaches its normal starting position. When the brush of terminal bank D steps off terminal 915, relay 901 releases and the circuit resumes its normal condition.

The foregoing descriptions are directed to the operation of the system when announcement machine No. 1 is employed as the "on line" machine, that is, with key OL operated to its upper position. To transfer announcement machine No. 2 from "standby" condition to "on line" condition it is necessary only that the key OL be actuated to its lower position. It will be understood that any suitable type of announcement machine may be employed and that the illustrated form is used merely for exemplary purposes.

In the event that both announcement machines are disabled, or for some other reasons are not available for service, the attending operator would be called upon to furnish the necessary announcement orally. This is made possible by the provision of the keys MAN and OP, Fig. 3, which, when operated, and with key OL in its neutral position complete obvious operating circuits for relays 207, 307, and 341, the last, when operated, connecting the power source 342 to the emergency amplifier 501, Fig. 5, by way of conductors 343 and 344. Relay 307, operated, completes an obvious energizing circuit for lamp MAN which lamp lights as an indication that the system is functioning on a manual basis. At its upper and inner lower armatures and front contacts, relay 307 extends conductors 220 and 221 to conductors 345 and 346, respectively, which are associated with the output terminals of amplifier 501 of the emergency equipment 500, the input terminals of which are connected, by way of network 504, to conductors 502 and 503 across which the transmitter 161 of the lower operator's telephone set 160 is bridged. The attending operator thus is in a position to transmit over each group of announcement trunk circuits an oral message of salutation. It will be observed that the output of amplifier 501 is also connected to the attendant's receiver 162 by way of the resistance path 505, conductors 506 and 507 and the sleeve contacts of jacks 163 and 264 and the corresponding terminals of the attendant's telephone cord. An indication of the level at which the oral message is being transmitted may be obtained from the volume indicator 510 which is connected, by way of resistance path 511, to the output terminals of amplifier 501 incident to the operation of relay 512 which follows the operation of key MANB1, Fig. 3.

When relay 207 operates in response to the actuation of key OP, it locks operated under control of relay 203 as in the case of machine-transmitted messages. The "call waiting" lamp is also lighted. The attending operator must, in the case of orally transmitted messages, await the lighting of such lamp before transmitting the message.

In order to change the announcement message on any of the two announcement machines, it is necessary only to operate the key MB to either of its upper or lower position, depending upon which machine is to be rendered busy and to operate the corresponding key REC-ER1 or key REC-ER2 to its lower or erase position, and thence reoperate to its upper or record position. Key MB, operated to its upper position, completes an obvious operating circuit for relay 301. Relay 301, at its outer upper armature and front contact, completes an obvious energizing circuit for lamp MB1 which lights as an indication that the corresponding announcement machine is in use for maintenance purporses. At its inner upper armature contacts, relay 301 opens the operating circuit to relay 302. At its innermost lower armature and front contact, relay 301 connects ground to conductor 303, thereby completing an obvious operating circuit for start relay 181 of announcement machine No. 1 to cause this machine to start operating. At its middle lower armature and front contact, relay 301 connects ground to the swinger of key REC-ER1 and at its uppermost lower armature and front contact, it places lamp REC1 under control of the interrupter 185 to cause this lamp to function as an indication that the recording operation is being performed on announcement machine No. 1. The key REC-ER1 is then operated to its lower position to extend the ground at the middle lower armature contacts of relay 301 to the winding of erase magnet 183 of announcement machine No. 1 by way of conductor 339 and thence to battery. The operation of erase magnet 183 in this circuit causes an erase operation to be performed on announcement machine No. 1. The key REC-ER1 is then operated to its upper position to extend the ground at the middle lower armature contacts of relay 301 to the winding of record relay 173 and battery, by way of conductor 338. The machine is thus placed in recording condition and the attendant may then dictate a new message for recording thereon in well known manner. In this instance the transmitter 161 of telephone set 160 is employed though the two telephone sets may be used interchangeably, and connection is made by way of jacks 163 and 164.

The erase and record operations just described with reference to the No. 1 announcement machine 180 may be performed also with respect to the No. 2 announcement machine 140 by associating the attendant's upper telephone set 160, Fig. 3, with the jacks 163' and 164' instead of with jacks 163 and 164.

Key MACHV1, Fig. 3, serves the same purpose with respect to the amplifiers of the Nos. 1 and 2 announcement machines as does key MANV1 with respect to emergency announcement amplifier 501, that is, when operated to its upper position, relay 513 is energized over an obvious circuit and operates to connect the volume indicator 510 to the output terminals of amplifier 170, and when actuated to its lower position, relay 514 is operated over an obvious circuit to connect the volume indicator 510 to the output terminals of the amplifier 150, which is associated with the No. 2 announcement machine 140.

What is claimed is:

1. In a signaling system, a telephone line, a station on said line, a signal device at said station, a remote point, a source of signaling current at said remote point, a second source of signaling current at said remote point, time controlled means for testing said line for idle or busy conditions, means responsive to an indicated idle condition of said line for connecting both said sources of signaling current to said line whereby said signal device responds to current from said first source as a call signal, means effective incident to the response of the subscriber at said station to a call signal for disconnecting said first source of current from said line, and other means controlled jointly from said station and said remote point for disconnecting said second source of current from said line.

2. A signaling system according to claim 1 including a message reproducing device which is connected to said telephone line simultaneously with the disconnection of said second source of current from said telephone line under control of the said jointly controlled means.

3. In a signaling system, a telephone line, a station on said line including a telephone receiver, a signal device at said station, a remote point, first and second sources of signaling current at said remote point, time controlled means for testing said line for idle and busy conditions thereof and for seizing said line if found idle, means responsive to the seizure of said line whereby said signal device responds to current from the first one of said sources of current as a call signal, means effective incident to the response to the call signal at said station for connecting the telephone receiver thereat to said second source of current and for disconnecting said first source of current from said line, and means controlled jointly from said station and said remote point for disconnecting said second source of current from said line.

4. A signaling system in accordance with claim 3, which includes an announcement device at said remote point, and in which said jointly controlled means is controlled by the receiver switchhook contacts at said station and by the announcement machine at said remote point.

5. In combination, a telephone switchboard, a plurality of line circuits each having a line termination at said switchboard, a plurality of time trunks having trunk terminations at said switchboard, cord connectors interconnecting line and trunk terminations, a source of signaling current, and means for connecting said current source to each of said trunks comprising switching means individual to each of said trunks, and time-controlled means for operating the switching means of said trunks at time-spaced intervals.

6. The combination defined in claim 5 which includes means for measuring a time interval of predetermined duration, and which includes means for enabling said time-controlled means at different times within the measured time interval.

7. In a call system for signaling preselected telephone substations at preset times, a plurality of line circuits each having a substation thereon, a signaling device at each substation, a plurality of normally open time trunk circuits, means interconnecting each of said line circuits and a different one of said trunk circuits, a switching device for closing all of said normally open time trunk circuits to extend them through to their respective connected line circuits, a source of signaling current, means responsive to the operation of said switching device for automatically connecting said source of signaling current to each of said line circuits by way of its connected time trunk circuit to subject the signaling device at each of the corresponding substations to current from said source, means for measuring a time interval of predetermined duration, and means rendering said switching device operable at different times during the measured time interval.

8. In a call system for signaling preselected telephone substations at preset times, a plurality of line circuits each having a substation thereon, a signaling device at each substation, a plurality of groups of normally open time trunk circuits, means interconnecting each of said line circuits and a different one of the time trunks of said groups of time trunks, a switching device for each of said groups of time trunks adapted, when operated, to close all of the time trunks of its respective group of trunks through to their respective connected line circuits, a source of signaling current, means responsive to the operation of either of said switching devices for connecting said source of signaling current to each of the line circuits by way of trunks of the corresponding group of trunks to subject the signaling device at each of the corresponding substations to current from said source of signaling current, means for measuring a time interval of predetermined duration, and means for rendering said switching devices selectively operable simultaneously or successively at different times during the measured time interval.

9. In a call system for signaling preselected telephone substations at preset times, a plurality of line circuits each having a substation thereon, a signaling device at each substation, a plurality of time trunk circuits, a switching device for effectively connecting each of said line circuits to a different one of said trunk circuits, a source of signaling current, means responsive to the operation of said switching device for connecting said source of signaling current simultaneously to each of said line circuits by way of the corresponding trunk circuit to subject the signaling device at each of the corresponding substations to current from said source whereby said substation signaling devices operate as call signals, means for measuring a time interval of predetermined duration, means rendering said switching device operable at different times during the measured time interval, a message reproducing device, and means effective incident to the response at any of said substations to a call signal for connecting said message reproducing device to the corresponding line circuit.

10. A call system according to claim 6 in which said time trunk circuits include means for detecting the idle or busy condition of the connected line circuits and said signaling current connecting means functions only upon the detection of idle line circuit conditions.

11. In a morning call signaling system, a switchboard, a plurality of telephone stations each including a signaling device and each having an associated line circuit terminating at said switchboard in a line termination, a plurality of trunk terminations at said switchboards, means comprising patching cords interconnecting line terminations and trunk terminations, a source of signaling current, and means for automatically connecting said source of signaling current to said trunk terminations successively at preset times whereby the signaling devices at said stations are subject to current from said source successively at corresponding preset times.

12. In a signaling system, telephone lines, a station on each of said lines, a signal device at each of said stations, a remote point, a source of signaling current at said remote point, an announcement device at said remote point, timing means for measuring a time period of predetermined duration, means for successively connecting groups of said trunks to groups of said line circuits and for maintaining said connections for a time interval of lesser predetermined duration, means responsive to the connection of said trunk circuits to line circuits which become idle at any time during the said time interval of lesser predetermined duration for connecting said source of signaling current to such lines to operate the signal devices at the corresponding stations as call signals, and means effective incident to the response to call signals at such stations for connecting said announcement device to said lines.

References Cited in the file of this patent

UNITED STATES PATENTS

| 1,295,096 | Anderson | Feb. 25, 1919 |
| 1,302,767 | Clausen et al. | May 6, 1919 |
| 2,413,825 | Gorden | Jan. 7, 1947 |
| 2,465,826 | Wolf et al. | Mar. 29, 1949 |
| 2,483,214 | Lomax | Sept. 27, 1949 |
| 2,555,714 | Talbot | June 5, 1951 |

FOREIGN PATENTS

| 577,258 | Great Britain | May 10, 1946 |